(12) United States Patent
Ramp et al.

(10) Patent No.: US 7,766,736 B2
(45) Date of Patent: Aug. 3, 2010

(54) CONVEYOR CHAIN SUPPORT FOR FEEDER HOUSE

(75) Inventors: Benjamin Earl Ramp, Geneseo, IL (US); John Anthony Schraeder, Geneseo, IL (US); Mark Edward Payne, Port Byron, IL (US); Rebecca Ann Frana-Guthrie, Coal Valley, IL (US); Mark Alan Melton, Erie, IL (US); Jeffrey Wayne Hogue, Geneseo, IL (US)

(73) Assignee: Deere & Company, Moline, IL (US)

( * ) Notice: Subject to any disclaimer, the term of this patent is extended or adjusted under 35 U.S.C. 154(b) by 450 days.

(21) Appl. No.: 11/357,345

(22) Filed: Feb. 17, 2006

(65) Prior Publication Data

US 2007/0197272 A1    Aug. 23, 2007

(51) Int. Cl.
*A01F 12/00*    (2006.01)
(52) U.S. Cl. .......................................... 460/16; 56/14.5
(58) Field of Classification Search .................. 56/14.5, 56/14.6, 122, 153, 59, 66, 75, 82, 88; 198/814, 198/841; 460/16, 114
See application file for complete search history.

(56) References Cited

U.S. PATENT DOCUMENTS

| 404,460 | A | * | 6/1889 | Akerson ...................... 198/728 |
| 2,214,920 | A | * | 9/1940 | Hunt et. al. ...................... 209/22 |
| 2,711,244 | A | * | 6/1955 | Hyman ...................... 198/522 |
| 2,716,481 | A | * | 8/1955 | Dray ........................... 198/699 |
| 3,306,673 | A | * | 2/1967 | Finch ........................... 406/36 |
| 3,699,753 | A |  | 10/1972 | Peak |
| 3,780,851 | A |  | 12/1973 | Bichel et al. |
| 3,796,296 | A | * | 3/1974 | Bakker ...................... 198/735.6 |
| 3,942,307 | A | * | 3/1976 | Quick .......................... 56/13.9 |
| 4,114,467 | A | * | 9/1978 | Petershack ................... 198/851 |
| 4,227,538 | A | * | 10/1980 | Long et al. ................... 460/128 |
| 5,976,613 | A | * | 11/1999 | Janusauskas ................. 427/66 |
| 6,116,008 | A | * | 9/2000 | Digman et al. ............... 56/15.8 |
| 2004/0211650 | A1 | * | 10/2004 | Linder ......................... 198/841 |

FOREIGN PATENT DOCUMENTS

| DE | 19631684 C1 | 1/1998 |
| GB | 852471 A | 10/1960 |
| GB | 2200526 A | * 8/1988 |
| WO | WO 02087312 A | 11/2002 |

OTHER PUBLICATIONS

European Search Report, Jan. 31, 2007, (4 pages).

* cited by examiner

*Primary Examiner*—Thomas B Will
*Assistant Examiner*—Joan D Misa

(57) ABSTRACT

A pivoting mid-floor section for use in a feeder house in an agricultural combine is located between the transverse drum and the transverse sprocket means. The pivoting mid-floor can move or adjust when a large volume of crop material is fed into the feeder house, while providing support for the conveyor chain along substantially the entire length of travel between the transverse drum and sprocket means, thus reducing the friction on the chain, and preventing the system slow downs that occurred in feeder house systems using a fixed mid-floor. Additionally, replaceable wear-resistant surfaces can be affixed to the runners or guides of the mid-floor to further extend wear life and reduce friction between the chain slats and mid-floor. The friction occurs between the wear pads on the runners or guides and the chain slats, rather than between the chain components and the mid-floor.

19 Claims, 5 Drawing Sheets

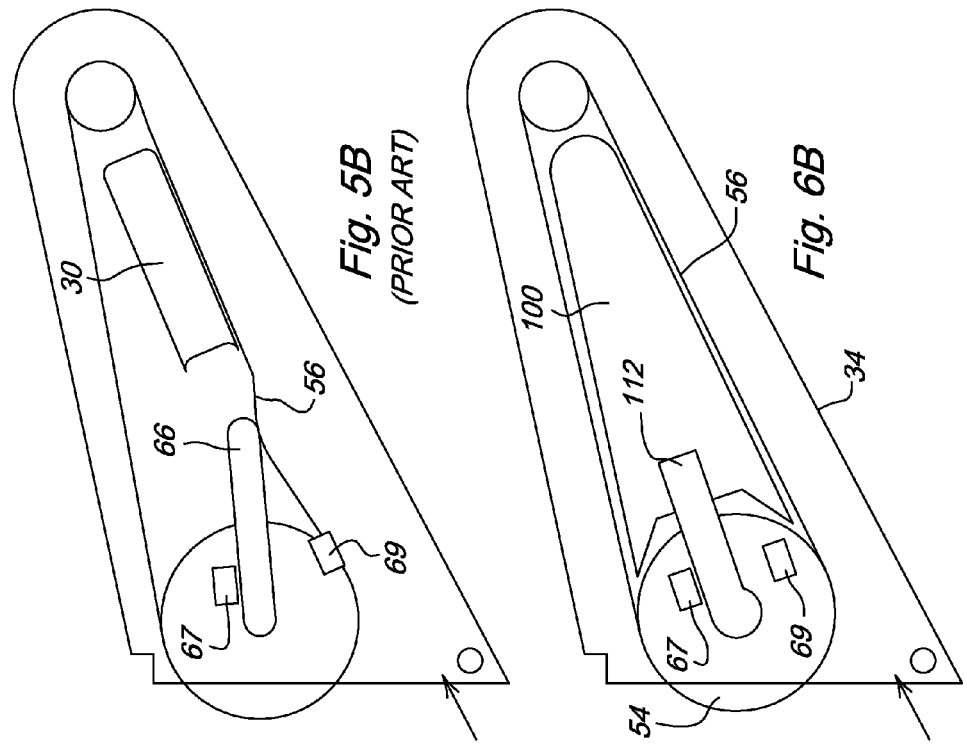
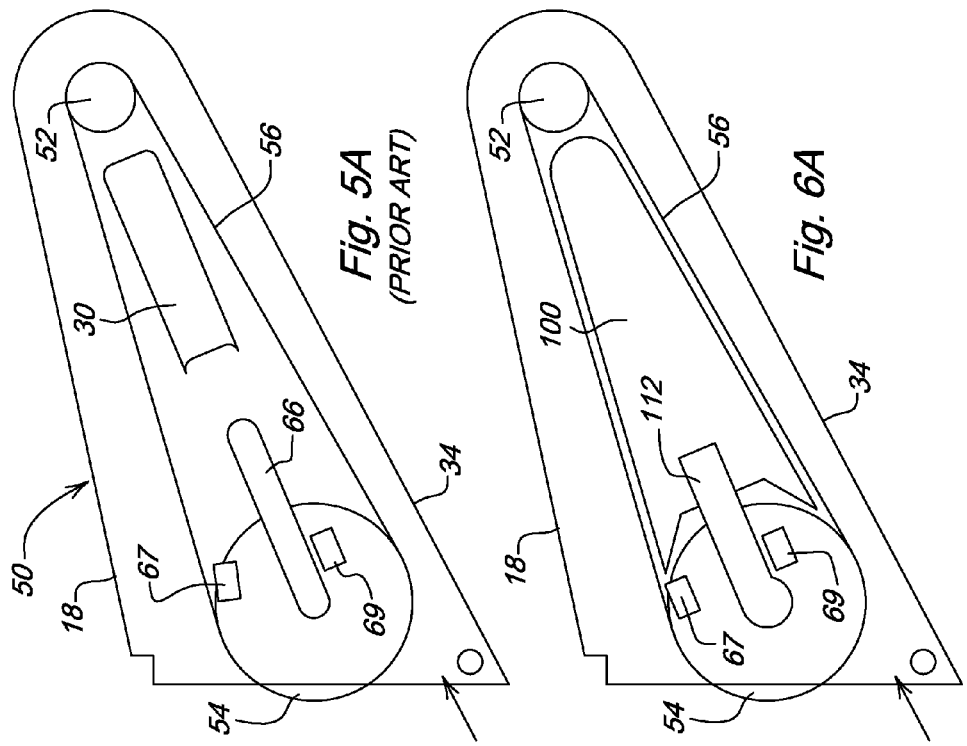
Fig. 5A (PRIOR ART)
Fig. 5B (PRIOR ART)
Fig. 6A
Fig. 6B

CONVEYOR CHAIN SUPPORT FOR FEEDER HOUSE

FIELD OF THE INVENTION

This invention relates to a crop feeding conveyor for an agricultural harvesting machine, such as a combine or the like, more particularly to a type of conveyor known as a chain-and-slat type conveyor, and even more particularly to a portion of the support system for a chain-and-slat type conveyor known as the mid-floor.

BACKGROUND OF THE INVENTION

Combines are large self-propelled vehicles used for harvesting and threshing agricultural crop in a field. A combine operates by cutting or gathering crop standing in a field, and feeding the cut crop to a separator by means of a conveyor mechanism contained in a mechanism known as a feeder house. In the separator, grain is threshed, or beaten from the husk, stems, pods, or cobs, and then the threshed grain is separated from crop material other than grain. The cleaned grain is moved to a grain tank, and the crop material other than grain is generally distributed back out on the field behind the combine, or collected for use as animal feed or bedding.

The feeder house comprises a housing that is mounted to the front of the combine and from which the harvesting assembly is mounted. The interior of the feeder house is provided with a conveyor for conveying the harvested crop material upwardly and rearwardly into the separator mechanism. Typically, the conveyors have a plurality of continuous chains that are arranged to revolve around a transverse drum at the front of the feeder house and transverse sprocket means at the rear of the feeder house, with a device, some times referred to as a mid-floor, located between the drum and sprocket means to provide structural support for the chains in the area between the two mechanisms, the chains rotating generally in the direction of the length of the combine.

A surge in volume of crop material entering the feeder house from the harvesting mechanism can place a large amount of pressure on the conveyor chain assembly, forcing the chain against fixed portions of the feeder house, conveyor assembly, and/or mid-floor, resulting in increased friction on the chain, which can cause premature chain wear and loss of lubrication through heating and evacuation. Additionally, the pressure on the chain can slow down the conveyor system in order to accommodate processing the volume of crop material, resulting in an increase in drive torque. This change in processing speed causes additional wear on the chain and drive components, and can lead to inefficient processing of crop material. In some situations, if a large volume of material becomes lodged in the feeder house, the system can stall, necessitating the system be shut down and the excess material removed.

Therefore, what is needed is a system that reduces combine feeder house component wear and operation load without the need to reduce operating speed of the combine so that crop intake volume and crop processing efficiency are not reduced, without crop loss or feeder house plugs occurring.

SUMMARY

It is an object of the present invention to provide a simple and effective throughput control system for an agricultural combine that reduces wear on the feeder house components without having to reduce the harvesting operation speed.

The present invention utilizes a pivoting mid-floor section located between the transverse drum and the transverse sprocket means. The pivoting mid-floor is an improvement over the previous fixed mid-floor devices in that the mid-floor can pivot or adjust when a large glut of material is being fed into the feeder house, thus reducing the friction on the chain, reducing the torque required to operate the system, and preventing the system slow downs that occurred in feeder house systems using a fixed mid-floor. Additionally, replaceable wear-resistant, low-friction wear pads can be affixed to the contact surfaces of the runners or guides of the mid-floor or to the underside of the slats to further extend wear life and reduce friction between the chain slats and mid-floor. The contact occurs between the wear pads and the conveyor parts, rather than between the chain components and the conveyor parts, reducing chain wear and friction heat.

The invention comprises a mid-floor assembly for a combine feeder house having a transverse drum mounted on a shaft at a front end thereof, sprocket drive means at a rear end thereof, a pivoting mid-floor located between the transverse drum and sprocket drive means, and chains disposed over and around the transverse drum and sprocket drive means for guiding crop material through the combine feeder house, the pivoting mid-floor comprising a plurality of slats longitudinally oriented between and connected to a front cross-member and a rear pivot rod, the front cross-member of the pivoting mid-floor connecting to an adjustment mechanism having an adjustment arm for setting a proper chain tension, and a drum arm affixed to the front cross member at a rear end and the shaft of the transverse drum at front end, the drum arm capable of moving the pivoting mid-floor in a substantially vertical direction when pressure is applied to the top or bottom of the mid-floor.

BRIEF DESCRIPTION OF THE DRAWINGS

FIG. 5A is a representative side view of a prior art conveyor mechanism in normal operating position;

FIG. 5B is a representative side view of a prior art conveyor mechanism processing a large volume of crop material;

FIG. 6A is a representative side view of a conveyor mechanism of the present invention in normal operating position; and FIG. 6B is a representative side view of a conveyor mechanism of the present invention processing a large volume of crop material.

DESCRIPTION OF THE PREFERRED EMBODIMENT

Figure 1:
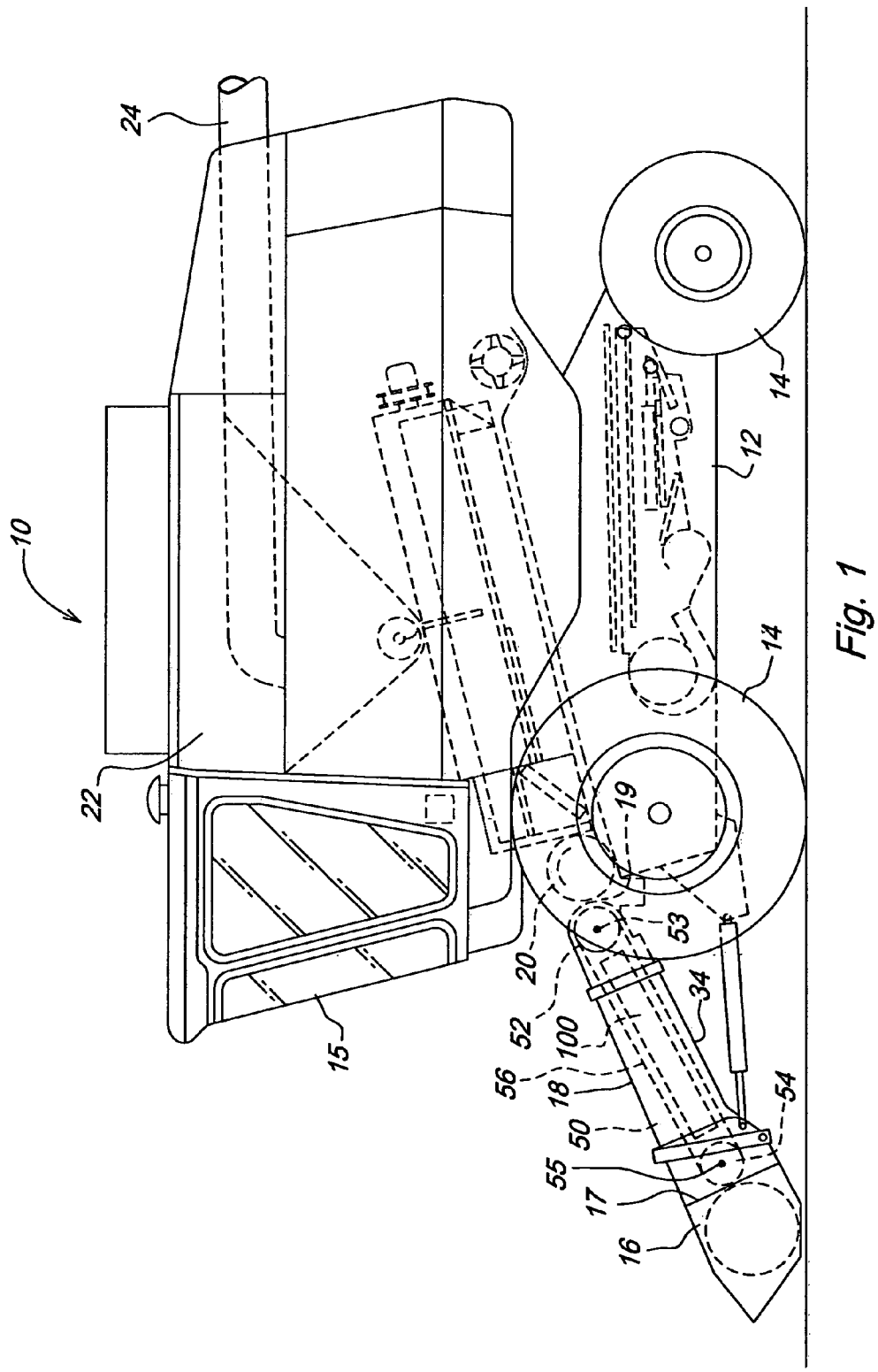
FIG. 1 is a partially cut-away side view of a combine.

In the discussion of the FIGURES the same reference numerals will be used throughout to refer to the same or similar components. In the interest of conciseness, various other components known to the art, such as crops, storage mechanisms and the like necessary for the operation of the invention, have not been shown or discussed, or are shown in block form.

In the following, numerous specific details are set forth to provide a thorough understanding of the present invention. However, it will be obvious to those skilled in the art that the present invention may be practiced without such specific details. Additionally, for the most part, details concerning harvester combine operation and the like have been omitted inasmuch as such details are not considered necessary to obtain a complete understanding of the present invention, and are considered to be within the knowledge of persons of ordinary skill in the relevant art.

FIG. 1 shows a combine 10 used for harvesting agricultural crops. The combine 10 comprises a supporting structure 12 having ground-engaging wheels 14 extending from the supporting structure 12. The operation of the combine 10 is controlled from the operator's cab 15. A harvesting platform 16 is used for harvesting a crop bearing grain. The cut crop is directed to a crop inlet 17 at a front of a feeder house 18. The crop is directed upwardly and rearwardly through the feeder house 18, then out a rear opening 19 in the feeder house 18 to the separator mechanism 20 which threshes the grain from the crop material. Once the grain has been separated from the crop material, it is fed into a grain tank 22, and is ultimately unloaded from the combine 10 by means of the unloading auger 24 into other transport or storage mechanisms.

The feeder house 18 contains a conveyor mechanism 50 used to convey the crop material through the feeder house 18. The conveyor mechanism 50 includes rear drive sprocket means 52 in a rear portion of the feeder house 18, near the separator mechanism 20, a transverse drum 54 mounted on a shaft 55, adjacent to the forward end of the feeder house 18, a plurality of transversely spaced endless conveyor chains 56 which are entrained around the rear drive sprockets 52 and the front transverse drum 54, with slats 60 connected across adjoining chains 56, and a mid-floor 100 of the present invention, which is used to provide structure and support to the conveyor mechanism 50. The rear drive sprockets 52 are mounted on a shaft 53 which is driven from a power source (not shown) on the combine 10. The feeder house 18 also has an upwardly and rearwardly inclined bottom floor 34.

Figure 2:
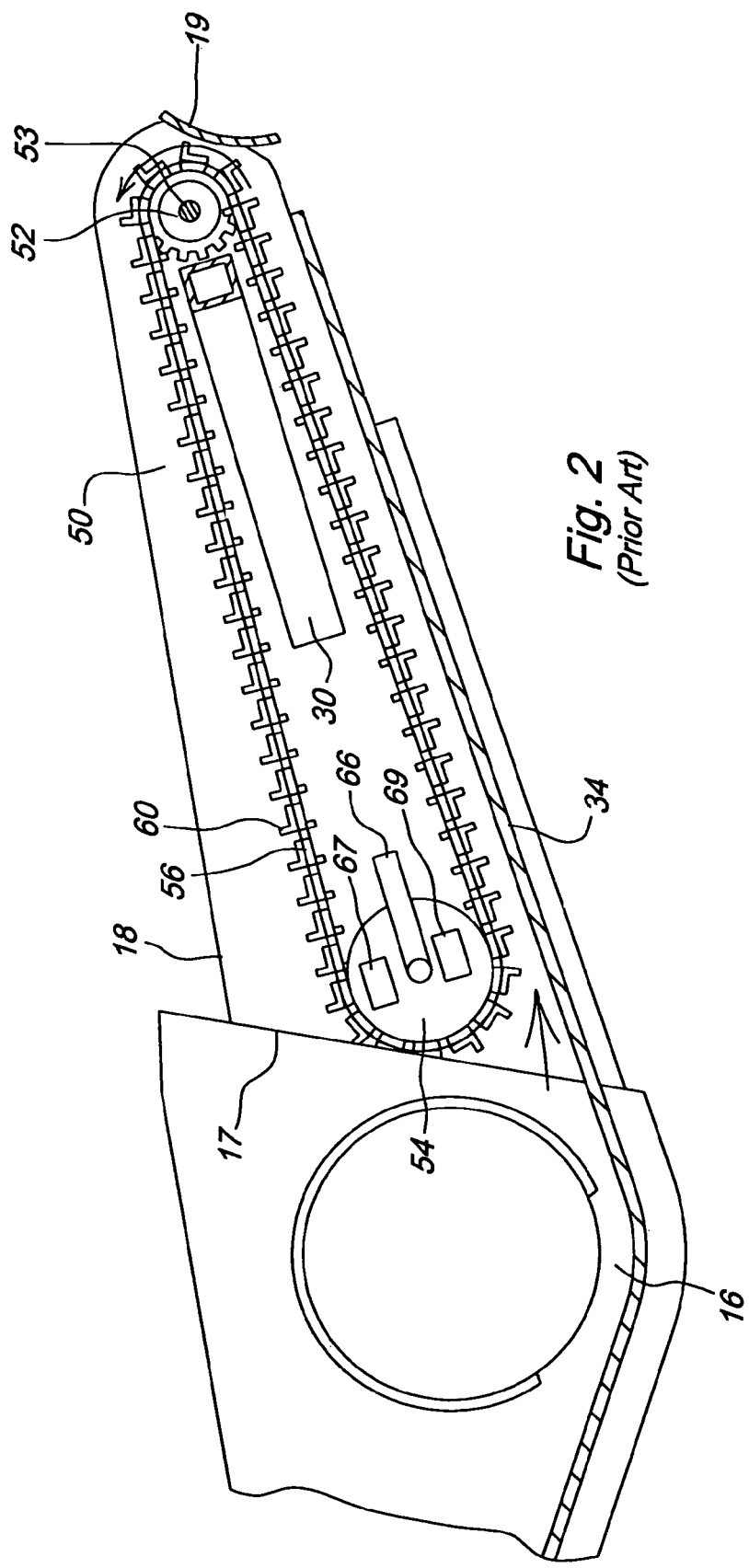
FIG. 2 is a partially cut-away side view of a feeder house shown with a fixed mid-floor mechanism of the prior art.

FIG. 2 shows a typical feeder house 18 and conveyor mechanism 50 of the prior art. In operation, the feeder house 18 has an crop inlet 17 at the front thereof to accept crop from the harvesting platform 16, with crop material being pulled upwardly and rearwardly through the feeder house 18 by being processed between the slats 60 attached thereon of the underside or lower run of the conveyor chain 56 and the bottom floor 34. The crop material is delivered through an opening 19 at the rear of the feeder house 18, and the chains 56 and attached slats 60 continue to rotate in the feeder house 18, now frontwardly and downwardly toward the front of the feeder house 18 to receive more crop material after rotating around the transverse drum 54 and once again moving upwardly and rearwardly. In prior art conveyor mechanisms 50, as shown in FIG. 2, the mid-floor 30, is fixed or stationary, and positioned at some distance to the rear of the transverse drum 54, leaving the chains 56 unsupported over a portion of their length during operation. Typically, a pivoting drum arm 66 was connected to the shaft 55 that runs through the length of the transverse drum 54, although in some prior art conveyor mechanisms, no pivoting drum arm 66 was used. When a pivoting drum arm 66 was used, upper and lower drum stops, 67, 69 were connected to the end of the transverse drum 54.

Figure 3:
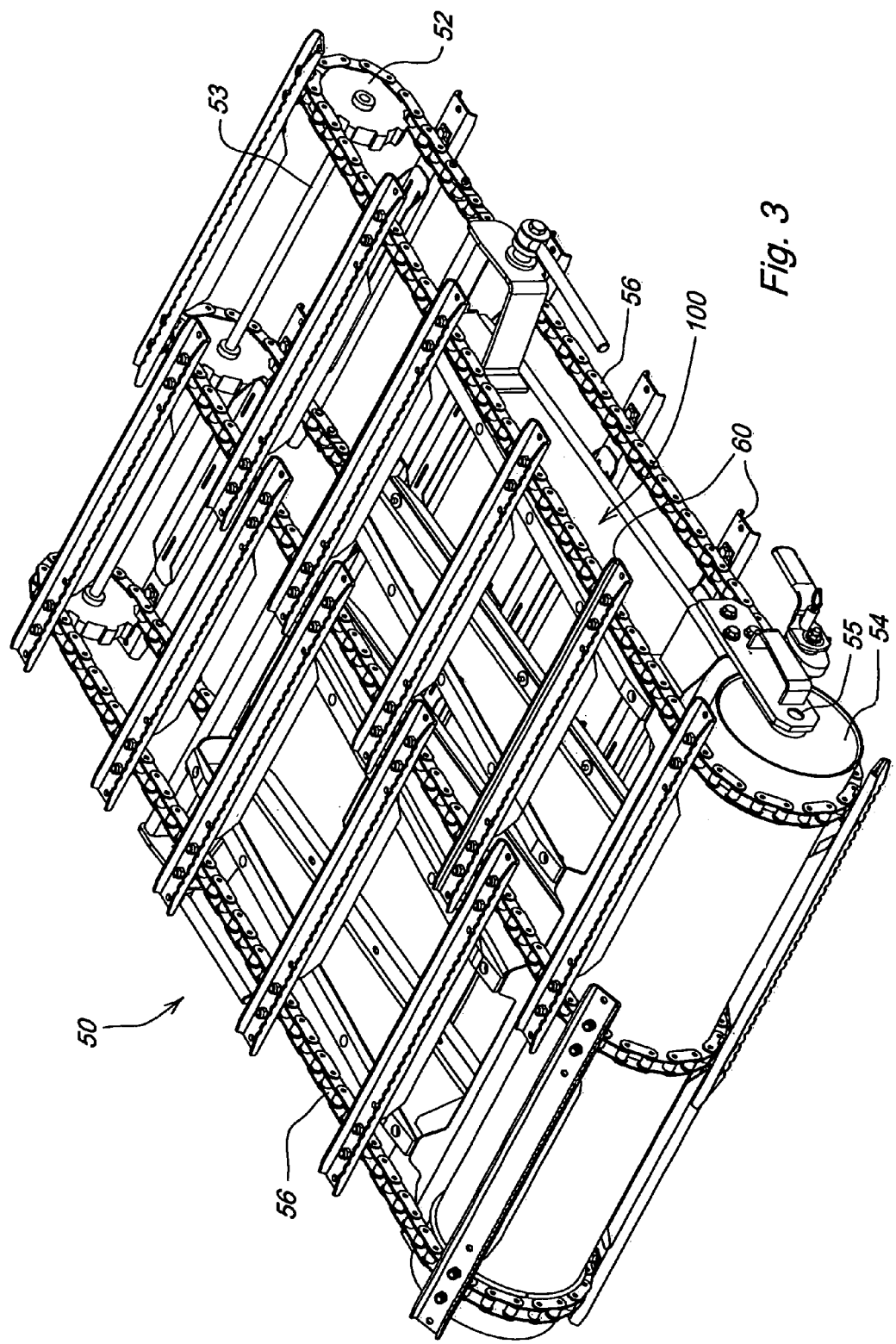
FIG. 3 is a perspective view of a conveyor mechanism utilizing a pivoting mid-floor device of the present invention.

FIG. 3 show a conveyor mechanism 50 of the present invention. The conveyor mechanism 50 includes rear drive sprocket means 52 mounted on a shaft 53 which is driven from a power source (not shown) on the combine 10, a front transverse drum 54 on a shaft 55, conveyor chains 56 which are longitudinally entrained around the rear drive sprockets 52 and the front transverse drum 54, chain slats 60 attached to the conveyor chains 56, and a pivoting mid-floor 100 which is used to provide structure and support to the conveyor mechanism 50. As can be seen, the pivoting mid-floor 100 extends almost the entire length of the conveyor 50 between the front transverse drum 54 and the rear drive sprocket means 52, providing support to the chains 56 and slats 60 along substantially the entire length of operation, as opposed to the prior art mechanism, in which a substantial gap existed between the front transverse drum 54 and the mid-floor 30.

Figure 4:
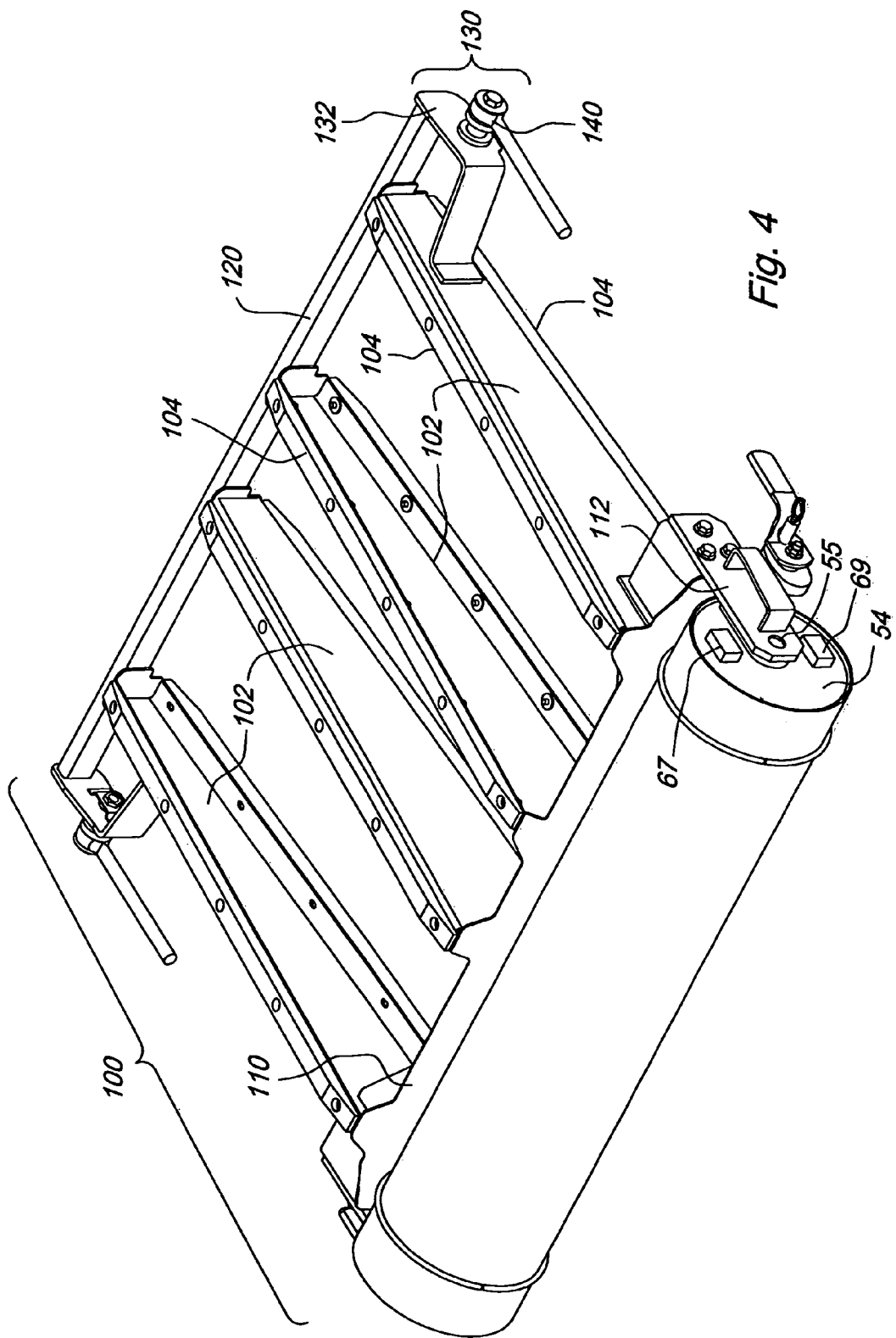
FIG. 4 is a perspective view of a pivoting mid-floor device of the present invention.

As can be seen in FIG. 4, the pivoting mid-floor 100 is comprised of a series of guides 102, which are tied to a front cross-member 110 and a rear pivot rod 120. A drum arm 112 is linked to the shaft 55 at a front end thereof, and to the front cross-member 110 at a rear end thereof. The movement from the shaft and transverse drum 54 is relayed to the mid-floor 100 by means of the drum arm 112. This movement enables the pivoting mid-floor 100 to pivot about the rear pivot rod 120 in response to crop being processed through the conveyor mechanism 50. When a large volume of material passes through the conveyor mechanism 50, the transverse drum 54 experiences greater movement. This movement is transferred to the pivoting mid-floor 100 via the drum arm 112, which pivots upward to the limit of the upper drum stop 67, enabling the mid-floor 100 to pivot.

Additionally, the pivoting mid-floor 100 has an adjustment mechanism 130 with an adjustment arm 132, which is used to adjust the position of the pivoting mid-floor 100 fore and aft in the feeder house 18 to maintain chain tension for optimal performance. Incorporated into the adjustment mechanism 130 is a spring-gauge tensioning mechanism 140. The spring gauge tensioning mechanism 140 allows the operator to adjust for and maintain consistent tension on the chains 56. This mechanism also allows the pivoting mid-floor 100 to react to a sudden large volume of material by allowing some relief of the chain tension, thus removing the instantaneous tensile loads on the chain 56. Because the pivoting mid-floor 100 is made from a series of guides 102, rather than being a single solid piece, it provides structure and rigidity, and can cover substantially the entire length of the area between the transverse drum 54 and rear drive sprockets 52 without any unnecessary increase in the over all weight of the structure. However, because the drum 54 and mid-floor 100 move together as a unit, the weight of both the drum 54 and the pivoting mid-floor 100 are used in controlling the flow of the crop, as opposed to prior art units where just the drum weight worked to control crop flow. This ability to apply greater weight for control of crop flow without having to add to the total weight of the feeder house 18 is an improvement over the prior art. By being able to apply additional weight to the crop mat, it is easier to break up the mat, and provide smoother feeding overall.

In the arrangement shown in FIG. 3, the chain slats 60 are of a configuration such that the rear side of the chain slats 60 contact the guides 102. However, other combines are configured so that the chain 56 would come in contact with the pivoting mid-floor 100. The pivoting drum arm 112 is rigidly mounted to the pivoting mid-floor 100 such that the entire pivoting mid-floor assembly 100 moves and pivots together, reacting like a drum arm that extends the full length of the feeder house 18.

In one arrangement of the present invention, replaceable wear pads 104 made of a wear-resistant low-friction material are incorporated into the conveyor mechanism 50 to further prolong life of the devices. In one arrangement of the present invention, the replaceable wear pads 104 are secured to the top and/or bottom surfaces of the guides 102 for extended wear life. In another arrangement of the present invention, replaceable wear pads 104 are secured to the underside of the chain slats 60 in the area that contacts the guides 102. In operation, as the chains 56 and attached chain slats 60 travel through the feeder house 18, there are pads 104 of wear-resistant material between the slats 60 and the guides 102. This layer of wear-resistant material placed between the moving parts reduces friction in the chain 56, which reduces heating that occurs when the chain 56 directly contacts metal surfaces, as on the prior art mechanism. this friction caused chain link wear, and caused the chain lubrication to heat up and evacuate fro the chain 56, resulting in premature chain wear and failures.

As can be seen in FIG. 5A, in the prior art conveyor mechanism 50, crop material flows into the feeder house 18 between the bottom floor 34 and the chain 56 and chain slats (not shown) and is fed towards the rear of the feeder house 18. The transverse drum 54 shown in this arrangement of the prior art conveyor mechanism has a pivoting drum arm 66 and top and bottom drum stops, 67, 69. The mechanism has a stationary mid-floor 30, which is positioned some distance behind the transverse drum 54. When the chain 56 and attached slats rotate around the drive sprockets 52 and front transverse drum 54, the chain 56 is suspended between the two in the space there between in the area of the mid-floor 30. In normal operation, the drum arm 66 would be positioned against the lower drum stop as shown in FIG. 5A.

When there was a large volume of crop material being moved through the feeder house 18, as shown in FIG. 5B, the pivoting drum arm 66 would move up to allow the chain 56 and chain slats (not shown) to move upwards, so the larger volume of material could pass between the bottom-floor 34 and the chain 56. However, if too large a volume of material was processed, the pivoting drum arm 66 would move upwards until it came in contact with the top drum stop 67, as shown in FIG. 5B. Pressure from the large volume of crop material would continue to press against the chain 56, bringing the inside of the chain 56 in contact with the stationary mid-floor 30, which would cause chain friction and heating, and consequent loss of lubrication and chain wear.

In contrast, in the present invention, as can be seen in FIG. 6A, crop material flows into the feeder house 18 between the bottom floor 34 and the chain 56 and chain slats 60 and is fed towards the combine body 10, just as in the prior art. The transverse drum 54 shown in this arrangement of the prior art conveyor mechanism has a top and bottom drum stops, 67, 69, and a drum arm 112 that is affixed to the shaft 55 of the transverse drum 54 at a front end thereof, with the rear end of the drum arm 112 being tied into the pivoting mid-floor 100. When the chain 56 and attached slats (not shown) rotate around the drive sprockets 52 and front transverse drum 54, the chain is suspended between the two in the space therebetween in the area of the pivoting mid-floor 100, which provides support along substantially the entire length of the chain. In normal operation, the drum arm 112 is positioned against the lower drum stop 69 as shown in FIG. 6A.

When a large volume of crop material is being moved through the feeder house 18, as shown in FIG. 6B, the pivoting mid-floor 100 moves up to allow the chain 56 to move upwards, so the larger volume of material can pass between the bottom floor 34 and the chain 56. When the pivoting mid-floor 100 moves upward, and the attached drum arm 112 moves up until it comes up against the upper drum stop 67. This ability to move away provides extra space for the increased volume of incoming crop material without having to slow down the crop processing. Because the chain 56 is supported along substantially its entire length of travel by the pivoting mid-floor 100, however, there is not the problem with the chain 56 bending and giving way as in the prior art mechanisms. Additionally, in those arrangements of the present invention that have wear pads 104 between the pivoting mid-floor 100 and the chain slats (not shown), as shown in FIG. 4, the wear to moving parts is reduced because of the presence of this wear-resistant material, increasing life of the equipment, including the chain 56. Thus, the present invention serves the purposes of reducing friction and enabling uptake of the greater volume of crop material without the system slowing down because of the friction and stress on the chain 60.

Having described the preferred embodiment, it will become apparent that various modifications can be made without departing from the scope of the invention as defined in the accompanying claims.

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

The invention claimed is:

1. In a combine for harvesting grain, a conveyor mechanism mounted in a feeder house having an upwardly inclined bottom floor, comprising:

said conveyor mechanism including a transverse drum located at a front of said conveyor mechanism and having a shaft extending therethrough;

sprocket drive means located at a rear of said conveyor mechanism;

a plurality of transversely spaced chains longitudinally disposed over and driven by the sprocket drive means and disposed over and carried by the transverse drum, with each of said chains having a lower run moving from said front to said rear of said conveyor mechanism when driven by said sprocket drive means;

chain slats extending across and mounted to said plurality of transversely spaced chains, the slats being positioned parallel to the transverse drum;

a pivoting mid-floor located between the transverse drum and sprocket drive means, the pivoting mid-floor having a plurality of transversely spaced longitudinal guides connected between a front cross-member and a rear pivot rod, said longitudinal guides being disposed to support said lower run of the plurality of transversely spaced chains and the slats mounted to the transversely spaced chains during their travel from the transverse drum to the sprocket drive means;

a drum arm having a forward end connected to the shaft of the transverse drum and having a rear end connected to the front cross-member of the pivoting mid-floor by means of a fixed joint; and the mid-floor being capable of pivoting about the rear pivot rod when grain in the feeder house applies pressure to the chain slats and attached chains on an underside of the conveyor mechanism, pressing the chain slats toward, and against the mid-floor, the mid-floor pivoting about the rear pivot rod in a direction opposite the direction of the pressure applied to the chain slats and chains.

2. The apparatus of claim 1 wherein the drum arm is located between upper and lower feeder drum stops that limit the range of pivoting of the mid-floor and attached drum arm.

3. The apparatus of claim 1 wherein wear pads made of a wear-resistant material are affixed to the under side of the longitudinal guides of the pivoting mid-floor.

4. The apparatus of claim 3 further comprising additional wear pads made of wear-resistant material being affixed to the upper side of the longitudinal guides of the pivoting mid-floor.

5. The apparatus of claim 4 wherein the wear-resistant material is low-friction.

6. The apparatus of claim 3 wherein the wear-resistant material is low-friction.

7. The apparatus of claim 1 further comprising an adjustment mechanism for adjusting the position of the pivoting mid-floor fore and aft in the feeder house to adjust chain tension.

8. The apparatus of claim 7 wherein the adjustment mechanism incorporates a spring-gauge tensioning mechanism for adjusting chain tension.

9. A pivoting mid-floor assembly for a conveyor mechanism of a combine feeder house, the conveyor mechanism having a transverse drum mounted on a shaft and being located at a front end of the conveyor mechanism, sprocket drive means being located at a rear end of said conveyor mechanism, the pivoting mid-floor assembly being located between the transverse drum and sprocket drive means, a plurality of transversely spaced, endless chains having chain slats affixed thereto and being disposed over and around the transverse drum and sprocket drive means for guiding crop material through the combine feeder house, the pivoting mid-floor comprising:
 a plurality of guides longitudinally oriented between and connected to a front cross-member and a rear pivot rod, said guides being disposed to support substantially all of a lower run of the chains by engaging only slats mounted to the lower run of chains during their travel from the transverse drum to the sprocket drive means when crop material moves between said lower run and a bottom floor of said feeder house, thereby reducing any frictional force between the lower runs of the chains and the plurality of guides;
 the front cross-member of the pivoting mid-floor connecting to an adjustment mechanism having an adjustment arm for setting a proper chain tension;
 a drum arm having a rear end affixed to the front cross member and having a front end affixed to the shaft of the transverse drum, the drum arm being capable of moving the pivoting mid-floor about the rear pivot rod in a substantially vertical direction when pressure is applied to the top or bottom of the mid-floor.

10. The assembly of claim 9 wherein the drum arm is located between upper and lower feeder drum stops that limit the range of pivoting of the drum arm and attached mid-floor.

11. The assembly of claim 9 wherein wear pads made of a wear-resistant material are affixed to an under side of the longitudinal guides of the pivoting mid-floor.

12. The assembly of claim 11 further comprising additional wear pads made of wear-resistant material being affixed to an upper side of the guides of the pivoting mid-floor.

13. The assembly of claim 12 wherein the wear-resistant material is low-friction.

14. The assembly of claim 11 wherein the wear-resistant material is low-friction.

15. The assembly of claim 9 wherein the adjustment mechanism adjusts the position of the pivoting mid-floor fore and aft in the feeder house to adjust chain tension.

16. The assembly of claim 15 wherein the adjustment mechanism incorporates a spring-gauge tensioning mechanism for adjusting chain tension.

17. A method of improving processing of crop material through a combine feeder house including a conveyor mechanism having a transverse drum mounted on a shaft and being at a front of said conveyor mechanism and having drive sprockets at a rear of said conveyor mechanism, with chains positioned and rotating around the transverse mounted drum and drive sprockets, chain slats being mounted to the chains, the slats positioned parallel to the transverse drum, and the drum being mounted for limited vertical pivoting movement, the method comprising:
 inserting a pivoting mid-floor between the transverse drum and drive sprockets to provide support for the chain and slats along substantially the entire path of travel from the transverse drum to the drive sprockets and spaced across the width of the slats;
 pivoting said transverse drum and mid-floor together about an axis located just forwardly of said drive sprockets; and
 supporting substantially an entire lower run of said chains and attached slats by contacting only said slats with an underside of said mid-floor during said vertical pivoting movement of said transverse drum and when crop material is exerting upward pressure on said lower run.

18. The method of claim 17 wherein said mid-floor includes a plurality of laterally spaced guides having pads of a wear resistant material secured along an underside of the guides of the pivoting mid-floor such that the chain slats contact the wear resistant pads to reduce friction on the chain and consequently reduce required operational torque, friction, and wear while enabling processing of a large volume of crop material without having to reduce combine speed.

19. The method of claim 17 wherein the step of pivoting includes coupling said transverse drum to the mid-floor so as to be rigid with said mid-floor, whereby a combined weight of the transverse drum and the pivoting mid-floor bears down on the crop material being processed between the bottom floor of the feeder house and the conveyor mechanism.

* * * * *